United States Patent
Sandon et al.

(10) Patent No.: US 7,496,731 B2
(45) Date of Patent: *Feb. 24, 2009

(54) TWO DIMENSIONAL ADDRESSING OF A MATRIX-VECTOR REGISTER ARRAY

(75) Inventors: Peter A. Sandon, Essex Junction, VT (US); R. Michael P. West, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/850,920

(22) Filed: Sep. 6, 2007

(65) Prior Publication Data

US 2008/0046681 A1    Feb. 21, 2008

Related U.S. Application Data

(63) Continuation of application No. 10/715,688, filed on Nov. 18, 2003, now Pat. No. 7,386,703.

(51) Int. Cl.
G06F 15/00 (2006.01)
G06F 15/76 (2006.01)

(52) U.S. Cl. .......................................... 712/4
(58) Field of Classification Search ....................... 712/4
See application file for complete search history.

(56) References Cited

U.S. PATENT DOCUMENTS

| | | | |
|---|---|---|---|
| 5,659,781 A | 8/1997 | Larson | |
| 5,812,147 A | 9/1998 | Van Hook et al. | |
| 5,832,290 A | 11/1998 | Gostin et al. | |
| 5,887,183 A | 3/1999 | Agarwal et al. | |
| 5,966,528 A | 10/1999 | Wilkinson et al. | |
| 6,230,176 B1 | 5/2001 | Mizutani | |
| 6,418,529 B1 | 7/2002 | Roussel | |

(Continued)

FOREIGN PATENT DOCUMENTS

JP    05-204744    8/1993

(Continued)

OTHER PUBLICATIONS

AMD 64-bit (in IDS).*

(Continued)

*Primary Examiner*—Eddie P Chan
*Assistant Examiner*—Brian P Johnson
(74) *Attorney, Agent, or Firm*—Schmeiser, Olsen & Watts; Anthony J. Canale

(57) ABSTRACT

A method for processing matrix data. The processor includes M independent vector register files which are adapted to collectively store a matrix of L data elements. Each data element has B binary bits. The matrix has N rows and M columns, and L=N*M. Each column has K subcolumns. N≧2, M≧2, K≧2, and B≧1. Each row and each subcolumn is addressable. The processor does not duplicatively store the L data elements. The matrix includes a set of arrays such that each array is a row or subcolumn of the matrix. The processor may execute an instruction that performs an operation on a first array of the set of arrays, such that the operation is performed with selectivity with respect to the data elements of the first array.

13 Claims, 7 Drawing Sheets

U.S. PATENT DOCUMENTS 6,573,846 B1    6/2003    Trivedi et al.
6,625,721 B1    9/2003    Chen

FOREIGN PATENT DOCUMENTS

JP           07-271764       10/1995

OTHER PUBLICATIONS

Lawrie, Duncan H.; Access and Alignment of Data in an Array Processor; IEEE Transactions on Computers, vol. C-24, No. 12; Dec. 1975; pp. 99-109.

128-Bit Media and Scientific Programming; AMD 64-Bit Technology; Chapter 4; Nov. 2001; pp. 131-144.

\* cited by examiner

↓ 20

21  22  23  24  25  26  27  28  29
↓   ↓   ↓   ↓   ↓   ↓   ↓   ↓   ↓

| REG Rx | A0 | A1 | A2 | A3 | m0 | m1 | m2 | m3 |
|---|---|---|---|---|---|---|---|---|
| R0 | 0 | 0 | 0 | 0 | 0 | 1 | 2 | 3 |
| R1 | 1 | 1 | 1 | 1 | 1 | 2 | 3 | 0 |
| R2 | 2 | 2 | 2 | 2 | 2 | 3 | 0 | 1 |
| R3 | 3 | 3 | 3 | 3 | 3 | 0 | 1 | 2 |
| R4 | 4 | 4 | 4 | 4 | 0 | 1 | 2 | 3 |
| R5 | 5 | 5 | 5 | 5 | 1 | 2 | 3 | 0 |
| R6 | 6 | 6 | 6 | 6 | 2 | 3 | 0 | 1 |
| ⋮ | | | | | | | | |
| R126 | 126 | 126 | 126 | 126 | 2 | 3 | 0 | 1 |
| R127 | 127 | 127 | 127 | 127 | 3 | 0 | 1 | 2 |
| R128 | 0 | 1 | 2 | 3 | 0 | 1 | 2 | 3 |
| R129 | 3 | 0 | 1 | 2 | 1 | 2 | 3 | 0 |
| R130 | 2 | 3 | 0 | 1 | 2 | 3 | 0 | 1 |
| R131 | 1 | 2 | 3 | 0 | 3 | 0 | 1 | 2 |
| R132 | 4 | 5 | 6 | 7 | 0 | 1 | 2 | 3 |
| R133 | 7 | 4 | 5 | 6 | 1 | 2 | 3 | 0 |
| ⋮ | | | | | | | | |
| R254 | 126 | 127 | 124 | 125 | 2 | 3 | 0 | 1 |
| R255 | 125 | 126 | 127 | 124 | 3 | 0 | 1 | 2 |

| 41 | 42 | 43 | 44 | 45 | 46 | 47 | 48 | 49 |

| REG Rx | A0 | A1 | A2 | A3 | m0 | m1 | m2 | m3 |
|---|---|---|---|---|---|---|---|---|
| R0 | 0 | 0 | 0 | 0 | 0 | 1 | 2 | 3 |
| R1 | 1 | 1 | 1 | 1 | 3 | 0 | 1 | 2 |
| R2 | 2 | 2 | 2 | 2 | 2 | 3 | 0 | 1 |
| R3 | 3 | 3 | 3 | 3 | 1 | 2 | 3 | 0 |
| R4 | 4 | 4 | 4 | 4 | 0 | 1 | 2 | 3 |
| R5 | 5 | 5 | 5 | 5 | 3 | 0 | 1 | 2 |
| R6 | 6 | 6 | 6 | 6 | 2 | 3 | 0 | 1 |
| ⋮ | | | | | | | | |
| R126 | 126 | 126 | 126 | 126 | 2 | 3 | 0 | 1 |
| R127 | 127 | 127 | 127 | 127 | 1 | 2 | 3 | 0 |
| R128 | 0 | 1 | 2 | 3 | 0 | 1 | 2 | 3 |
| R129 | 3 | 0 | 1 | 2 | 3 | 0 | 1 | 2 |
| R130 | 2 | 3 | 0 | 1 | 2 | 3 | 0 | 1 |
| R131 | 1 | 2 | 3 | 0 | 1 | 2 | 3 | 0 |
| R132 | 4 | 5 | 6 | 7 | 0 | 1 | 2 | 3 |
| R133 | 7 | 4 | 5 | 6 | 3 | 0 | 1 | 2 |
| ⋮ | | | | | | | | |
| R254 | 126 | 127 | 124 | 125 | 2 | 3 | 0 | 1 |
| R255 | 125 | 126 | 127 | 124 | 1 | 2 | 3 | 0 |

*FIG. 5*

REGISTER MOVE/COPY WITH SOURCE SELECTION: rDEST ← rRA[aa,bb,cc,dd]

| OPCODE | DEST | RA | aa | bb | cc | dd |
|---|---|---|---|---|---|---|
| 8 BITS | 8 BITS | 8 BITS | 2 BITS | 2 BITS | 2 BITS | 2 BITS |

FIG. 6A

REGISTER MERGE UNDER MASK: rDEST ←————— (rDEST, rRA)

| OPCODE | DEST | RA | reserved | mask |
|---|---|---|---|---|
| 8 BITS | 8 BITS | 8 BITS | 4 BITS | 4 BITS |

FIG. 6B

SCALAR/VECTOR 3 OPERAND FP INSTRUCTION: rDEST ← f(rRB, rRA [aa,aa,aa,aa])

| OPCODE | aa | DEST | RA | RB |
|---|---|---|---|---|
| 6 BITS | 2 BITS | 8 BITS | 8 BITS | 8 BITS |

FIG. 6C

TWO DIMENSIONAL ADDRESSING OF A MATRIX-VECTOR REGISTER ARRAY

This application is a Continuation of Ser. No. 10/715,688, filed Nov. 18, 2003.

BACKGROUND OF THE INVENTION

1. Technical Field

The present invention relates to logically addressing both rows and subcolumns of a matrix stored in a plurality of vector register files within a processor.

2. Related Art

A Single Instruction Multiple Data (SIMD) vector processing environment may be utilized for operations associated with vector and matrix mathematics. Such mathematics processing may relate to various multimedia applications such as graphics and digital video. A current problem associated with SIMD vector processing arises from a need to handle vector data flexibly. The vector data is currently handled as a single (horizontal) vector of multiple elements when operated upon in standard SIMD calculations. The rows of the matrix can therefore be accessed horizontally in a conventional manner. However it is often necessary to access the columns of the matrix as entities, which is problematic to accomplish with current technology. For example, it is common to generate a transpose of the matrix for accessing columns of the matrix, which has the problem of requiring a large number of move/copy instructions and also increases (i.e., at least doubles) the number of required registers.

Accordingly, there is a need for an efficient processor and method for addressing rows and columns of a matrix used in SIMD vector processing.

SUMMARY OF THE INVENTION

The present invention provides a processor, comprising M independent vector register files, said M vector register files adapted to collectively store a matrix of L data elements, each data element having B binary bits, said matrix having N rows and M columns, said L=N*M, each column having K subcolumns, said N≧2, said M≧2, said K≧1, said B≧1, each row of said N rows being addressable, each subcolumn of said K subcolumns being addressable, said processor not adapted to duplicatively store said L data elements.

The present invention provides a method for processing matrix data, comprising:
providing the processor; and
providing M independent vector register files within the processor, said M vector register files collectively storing a matrix of L data elements, each data element having B binary bits, said matrix having N rows and M columns, said L=N*M, each column having K subcolumns, said N≧2, said M≧2, said K≧1, said B≧1, each row of said N rows being addressable, each subcolumn of said K subcolumns being addressable, said processor not duplicatively storing said L data elements.

The present invention provides a processor, comprising M independent vector register files, said M vector register files adapted to collectively store a matrix of L data elements, each data element having B binary bits, said matrix having N rows and M columns, said L=N*M, each column having K subcolumns, said N≧2, said M≧2, said K≧1, said B≧1, each row of said N rows being addressable, each subcolumn of said K subcolumns being addressable, said matrix including a set of arrays such that each array is a row or subcolumn of the matrix, said processor adapted to execute an instruction that performs an operation on a first array of the set of arrays, said operation being performed with selectivity with respect to the data elements of the first array.

The present invention provides a method for processing matrix data, comprising:
providing the processor;
providing M independent vector register files within the processor, said M vector register files collectively storing a matrix of L data elements, each data element having B binary bits, said matrix having N rows and M columns, said L=N*M, each column having K subcolumns, said N≧2, said M≧2, said K≧1, said B≧1, each row of said N rows being addressable, each subcolumn of said K subcolumns being addressable, said matrix including a set of arrays such that each array is a row or subcolumn of the matrix; and
executing an instruction by said processor, said instruction performing an operation on a first array of the set of arrays, said operation being performed with selectivity with respect to the data elements of the first array.

The present invention advantageously provides an efficient processor and method for addressing rows and columns of a matrix used in SIMD vector processing.

BRIEF DESCRIPTION OF THE DRAWINGS

FIG. 3 depicts a read-logic table for reading the data elements from the physical layout of FIG. 2 into the rows and subcolumns of the matrix of FIG. 1, in accordance with embodiments of the present invention.

FIG. 5 depicts a write-logic table for writing the data elements from the rows and subcolumns of the matrix of FIG. 1 into the physical layout of FIG. 4, in accordance with embodiments of the present invention.

FIG. 6A-6C depicts instructions which utilize the multiplexors of FIG. 2 or FIG. 4 to perform operations with selectivity with respect to the data elements of a row or subcolumn of the matrix of FIG. 1, in accordance with embodiments of the present invention.

DETAILED DESCRIPTION OF THE INVENTION

Figure 1:
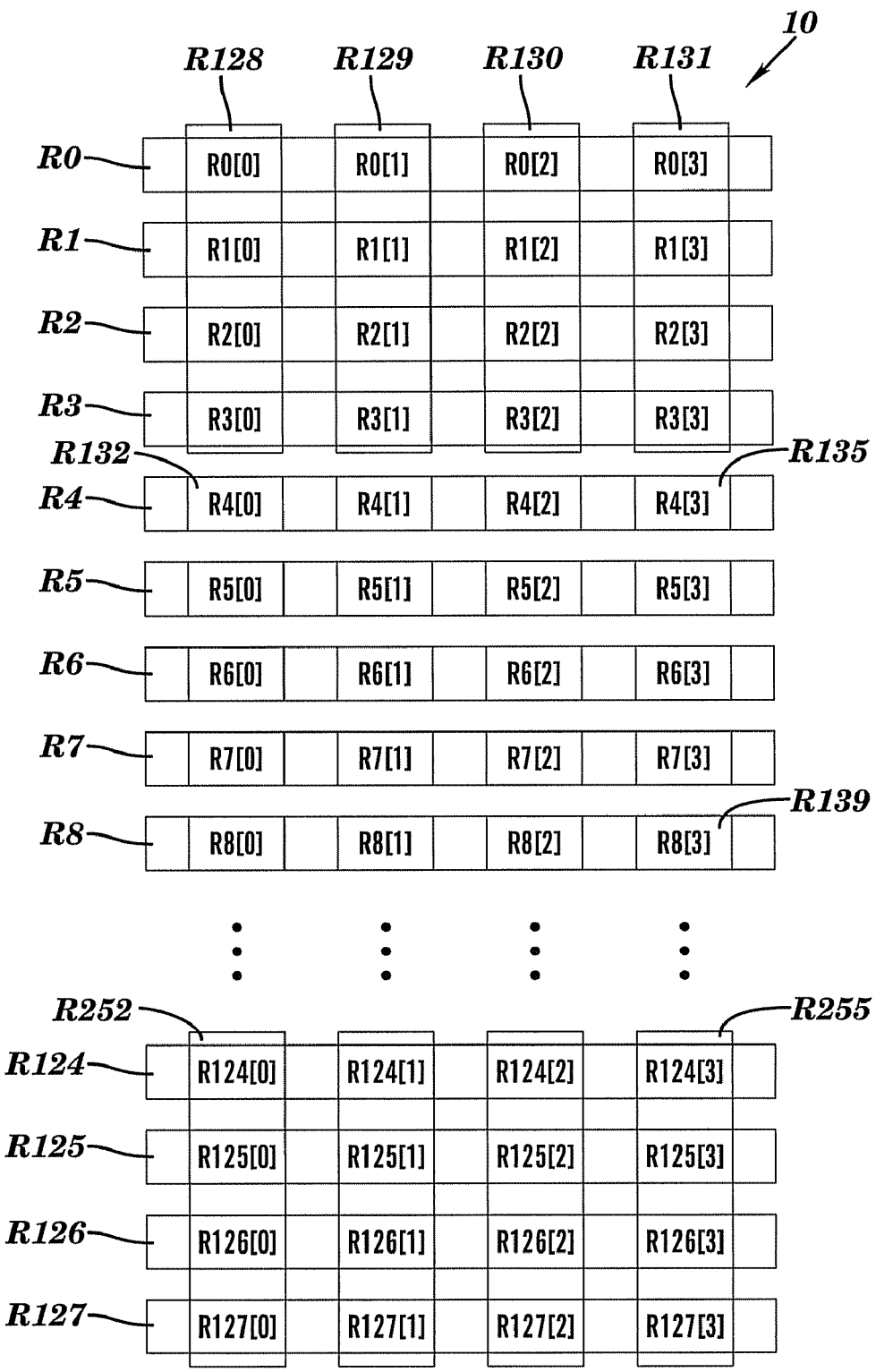
FIG. 1 depicts a layout of a matrix of data elements, in accordance with embodiments of the present invention.

FIG. 1 depicts a layout of a matrix 10 of data elements, in accordance with embodiments of the present invention. The matrix 10 comprises 128 rows (denoted as rows 0, 1, . . . , 127) and 4 columns (denoted as columns 0, 1, 2, 3). Rows 0, 1, . . . , 127 are addressed as registers R0, R1, . . . , R127, respectively (i.e., registers Rn, n=0, 1, . . . , 127). The columns are each divided into subcolumns as follows:

column 0 is divided into subcolumns 128, 132, . . . , 252;
column 1 is divided into subcolumns 129, 133, . . . , 253;
column 2 is divided into subcolumns 130, 134, . . . , 254; and
column 3 is divided into subcolumns 131, 135, . . . , 255.

Subcolumns 128, 129, . . . , 255 are addressed as registers R128, R129, . . . , R255, respectively (i.e., registers Rn, n=128, 129, . . . , 255).

FIG. 1 also depicts data elements of the matrix 10. Each data element includes B binary bits (e.g., B=32). The data elements of the matrix 10 have the form Rn[m] wherein n is a row index (n=0, 1, . . . , 127) and m is a column index (m=0, 1, 2, 3). For example R5[2] denotes the data element in row 5, column 2 of the matrix 10. As seen in FIG. 1:

register R0 contains row 0 (i.e., data elements R0[0], R0[1], R0[2], R0[3]);

register R1 contains row 1 (i.e., data elements R1[0], R1[1], R1[2], R1[3]);

register R127 contains row 127 (i.e., data elements R127 [0], R127[1], R127[2], R127[3]);

register R128 contains subcolumn 0 (i.e., data elements R0[0], R1[0], R2[0], R3[0]);

register R129 contains subcolumn 1 (i.e., data elements R0[1], R1[1], R2[1], R3[1]);

register R255 contains subcolumn 128 (i.e., data elements R0[128], R1[128], R2[128],R3[128].

Figure 2:
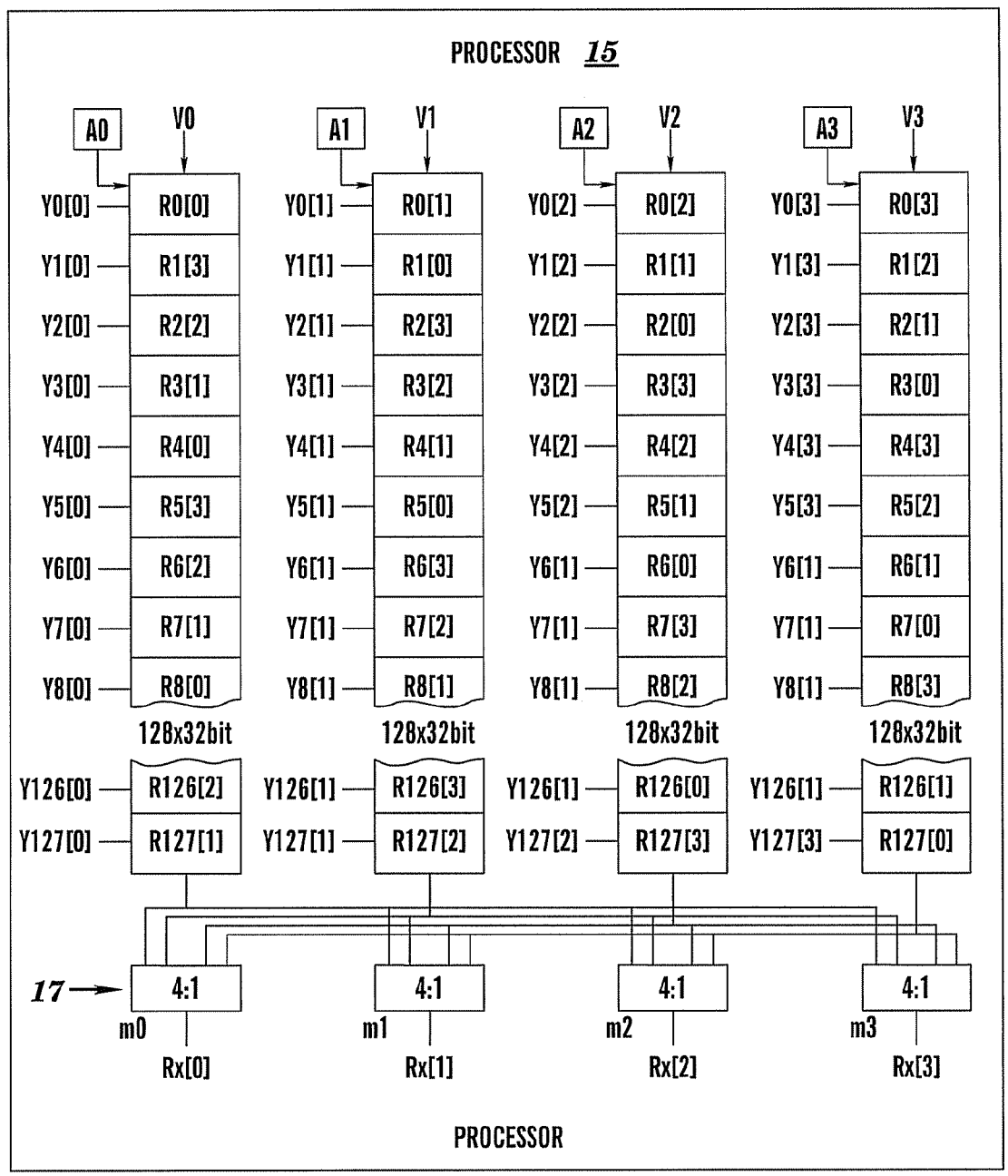
FIG. 2 depicts a physical layout for storing the data elements of the matrix of FIG. 1 and multiplexors for reading the data elements into the matrix of FIG. 1, in accordance with embodiments of the present invention.

Instructions for moving and reorganizing data of the matrix 10 of FIG. 1 are processed by a processor, wherein the processor includes: vector register files, address registers for accessing the vector register files, and multiplexors. Accordingly, FIG. 2 depicts a processor 15, comprising vector register files (V0, V1, V2, V3), address registers (A0, A1, A2, A3), and 4:1 multiplexors (m0, m1, m2, and m3), in accordance with embodiments of the present invention. In FIG. 2, the vector register files are used in conjunction with the address registers and multiplexors to read rows or subcolumns of the matrix 10 of FIG. 1 from the vector register files. Each of the vector register files includes 128 registers. The number (4) of said vector register files is equal to the number (4) of columns of the matrix 10 of FIG. 1. Vector register file Vj (j=0, 1, 2, 3) includes registers Yi[j] for i=0, 1, . . . , 127 (i.e., Y0[j], Y1[j], . . . , Y127[j]). For example, vector register file V3 (i.e., j=3) includes registers Y0[3], Y1[3], . . . , Y127[3]. Each of vector register files V0, V1, V2, and V3 (and the 128 registers therein) are independently addressable via address registers A0, A1, A2, and A3, respectively. Generally, address register Aj (j=0, 1, 2, 3) addresses register Yi[j] of vector register file Vj if Aj contains i (i=0, 1, . . . , 127). For example, if address register A2 contains the integer 4, then address register A2 addresses register Y4[2] of vector register file V2.

The data elements Rn[m] of the matrix 10 of FIG. 1 are stored and distributed within the vector register files V0, V1, V2, and V3 as shown in FIG. 2. In FIG. 2, the distribution of data array elements Rn[m] within the registers of the vector register files V0, V1, V2, and V3 facilitates addressing of both the rows and subcolumns of the matrix 10 of FIG. 1 for vector-read operations, as will be explained infra in conjunction with FIG. 3. It is noted from FIG. 2 that the matrix 10 of FIG. 1 is stored in the vector register files V0, V1, V2, and V3 in accordance with the following two rules.

The first rule relates to the storing of a row of the matrix 10 into the vector register files. The first rule is as follows: if data element Rn[m] is stored in register Yn[j] then data element R(n)[m1] is stored in register Y(n)[j1], wherein j1=(j+1) mod 4 (i.e., j=0, 1, 2, 3 maps into j1=1, 2, 3, 0, respectively), and wherein m1=(m+1) mod 4 (i.e., m=0, 1, 2, 3 maps into m1=1, 2, 3, 0, respectively). The operator "mod" is a modulus operator defined as follows. If I1 and I2 are positive integers then I1 mod I2 is the remainder when I1 is divided by I2. As an example of the first rule, data elements R0[0], R0[1], R0[2], R0[3] of the row associated with register R0 are respectively stored in registers Y0[0], Y0[1], Y0[2], Y0[3], whereas data elements R1[0], R1[1], R1[2], R1[3] of the row associated with register R1 are respectively stored in registers Y1[1], Y1[2], Y1[3], Y1[0]. As a consequence of the first rule, each of data elements Rn[0], Rn[1], Rn[2], Rn[3] of row n is stored in a different vector register file but in a same relative register location (i.e., i=n for register Yi[j]) in its respective vector register file. Thus, the data elements Rn[0], Rn[1], Rn[2], Rn[3] of the row associated with register Rn are stored as a permuted sequence thereof in the registers Yn[0], Yn[1], Yn[2], Yn[3] of FIG. 2.

The second rule relates to the storing of a subcolumn of the matrix 10 into the vector register files: if data element Rn[m] is stored in register Yn[j] then data element R(n+1)[m] is stored in register Y(n+1)[j1], wherein j1=(j+1) mod 4. As an example of the second rule, data elements R0[1], R1[1], R2[1], R3[1] of the subcolumn pointed to by register R129 are respectively stored in registers Y0[1],Y1[2],Y2[3],Y3[0]. As a consequence of said second rule, each of data elements Rn[0], Rn[1], Rn[2], Rn[3] of row n is stored in a different vector register file and in a different relative vector register location, characterized by index i for register Yi[j]), in its respective vector register file. Thus, the data elements of each subcolumn are stored in a broken diagonal fashion in the registers of the vector register files V0, V1, V2, and V3.

The multiplexors m0, m1, m2, and m3 in FIG. 2 sequentially order the data elements read from the vector register files V0, V1, V2, and V3 in conjunction with logical interconnections 17 between the vector register files V0, V1, V2, V3 and the multiplexors m0, m1, m2, and m3. The logical interconnections 17 are described in a read-logic table 20 shown in FIG. 3, as will be discussed next.

FIG. 3 depicts a read-logic table 20 for reading rows and subcolumns of the matrix 10 of FIG. 1 from the vector register files and V0, V1, V2, V3 while utilizing the multiplexors m0, m1, m2, and m3 of FIG. 2, in accordance with embodiments of the present invention. In FIG. 3, column 21 of the read-logic table 20 lists registers R0, R1, . . . , R255 of FIG. 1. Columns 22-25 of the read-logic table 20 list the values of address registers A0, A1, A2, A3. Columns 26-29 of the read-logic table 20 list the values of multiplexors m0, m1, m2, and m3. Each of said multiplexors (m0, m1, m2, m3) is a set of two binary switches, each switch being "on" or "off" and being represented by a binary bit 1 or 0, respectively. Thus, the "value" of the multiplexor is the composite value (0, 1, 2, or 3) of the two binary bits respectively representing the on/off status of the two switches.

Each row of the matrix 10 to be read is identified by the index n which selects a register Rn in the range $0 \leq n \leq 127$. Each subcolumn of the matrix 10 to be read is identified by the index n which selects a register Rn in the range $128 \leq n \leq 255$. The data elements of each row or subcolumn to be read are accessed from registers Yi[j] of the vector register files V0, V1, V2, and V3, said registers being pointed to by the address registers A0, A1, A2, A3, respectively. The data elements so accessed from the registers pointed to by the address registers A0, A1, A2, and A3 are sequentially ordered in accordance with the values of the multiplexors m0, m1, m2, and m3 as follows. The multiplexor value is the index j that selects a vector register file (V0, V1, V2, or V3). Then the content of the address register associated with the selected vector register file selects the data element. Recall that Yi[j] denotes register i of vector register file Vj. If a row or subcolumn to be read is identified by register Rn, then the data elements are accessed from the registers Yi[j] in the sequential order of: Y(a0)[m0], Y(a1)[m1], Y(a2)[m2], and Y(a3)[m3], wherein a0, a1, a2, and a3 denote the content of A(m0), A(m1), A(m2), and A(m3), respectively. For example, if A0=2, A1=3, A2=0, A3=1 and m0=3, m1=2, m2=1, and m3=0, then:

a0=1 (i.e., content of A(m0) or A3),
a1=0 (i.e., content of A(m1) or A2),
a2=3 (i.e., content of A(m2) or A1), and
a3=2 (i.e., content of A(m3) or A0).

As an example of reading a row, assume that the row to be read is associated with register R2 (see FIG. 1). Then from the R2 row of FIG. 3: A0=2, A1=2, A2=2, A3=2 and m0=2, m1=3, m2=0, m3=1. The data elements are accessed from the registers Ri[j] in the sequential order of Y(a0)[2], Y(a1)[3], Y(a2)[0], and Y(a3)[1] as dictated by the values of m0, m1, m2, and m3, respectively. Using the values of A0, A1, A2, A3 and m0, m1, m2, m3 it follows that a0=2, a1=2, a2=2, and a3=2. Thus, the data elements are accessed from the registers Ri[j] in the sequential order of Y2[2], Y2[3], Y2[0], and Y2[1]. Therefore, referring to FIG. 2 for the contents of Yi[j], the data elements are accessed in the sequential order of R2[0], R2[1], R2[2], and R2[3], which is the correct ordering of data elements of the row associated with register R2 as may be verified from FIG. 1.

As an example of reading a subcolumn, assume that the subcolumn to be read is associated with register R129 (see FIG. 1). Then from the R129 row of FIG. 3: A0=3, A1=0, A2=1, A3=2 and m0=1, m1=2, m2=3, m3=0. Thus the data elements are accessed from the registers Y[j] in the sequential order of Y(a0)[1], Y(a1)[2], Y(a2)[3], and Y(a3)[0] as dictated by the values of m0, m1, m2, and m3, respectively. Using the values of A0, A1, A2, A3 and m0, m1, m2, m3 it follows that a0=0, a1=1, a2=2, and a3=3. Thus, the data elements are accessed from the registers Ri[j] in the sequential order of Y0[1], Y1[2], Y2[3], and Y3[0]. Therefore, referring to FIG. 2 for the contents of Yi[j], the data elements are accessed in the sequential order of R0[1], R1[1], R2[1], and R3[1], which is the correct ordering of data elements of the subcolumn associated with register R129 as may be verified from FIG. 1.

The preceding examples illustrate that in order for the multiplexors m0, m1, m2, and m3 to sequentially order the accessed data elements so as to correctly read a row or subcolumn of the matrix 10 of FIG. 1, the following general rule is adhered to regarding the storage of data elements in the registers of the vector register files. The data elements of each subcolumn are stored in different vector register files, which means that for each subcolumn, no two data elements therein are stored in a same vector register file. Similarly, the data elements of each row are stored in different vector register files, which means that for each row, no two data elements therein are stored in a same vector register file. While FIG. 2 shows a particular distribution of data array elements Rn[m] within the registers Yi[j] of the vector register files V0, V1, V2, and V3, other distribution of data array elements Rn[m] are within the scope of the present invention, such that the preceding general rule is adhered to. The read-logic table (e.g., see FIG. 3) for reading rows or subcolumns is specific to the particular distribution of data array elements Rn[m] within registers Yi[j].

Thus, the multiplexors m0, m1, m2, and m3 are adapted to respond to a command to read a row (or subcolumn) of the matrix by mapping the data elements of the row (or subcolumn) from the vector register files V0, V1, V2, and V3 to the row (or subcolumn) in accordance with a read-row (or read-column) mapping algorithm as exemplified by the read-logic table 20 of FIG. 3. Instead of using the read-logic table 20 having numerical values therein, one could alternatively implement the read-row (or read-column) mapping algorithm by use of Boolean logic statements.

FIG. 2, described supra, relates to reading a row or subcolumn of the matrix 10 of FIG. 1 from the registers Yi[j] in accordance with the read-logic table 20 of FIG. 3. As described next, FIG. 4 relates to writing a row or subcolumn of the matrix 10 of FIG. 1 into the registers Yi[j] in accordance with the write-logic table 40 of FIG. 5.

Figure 4:
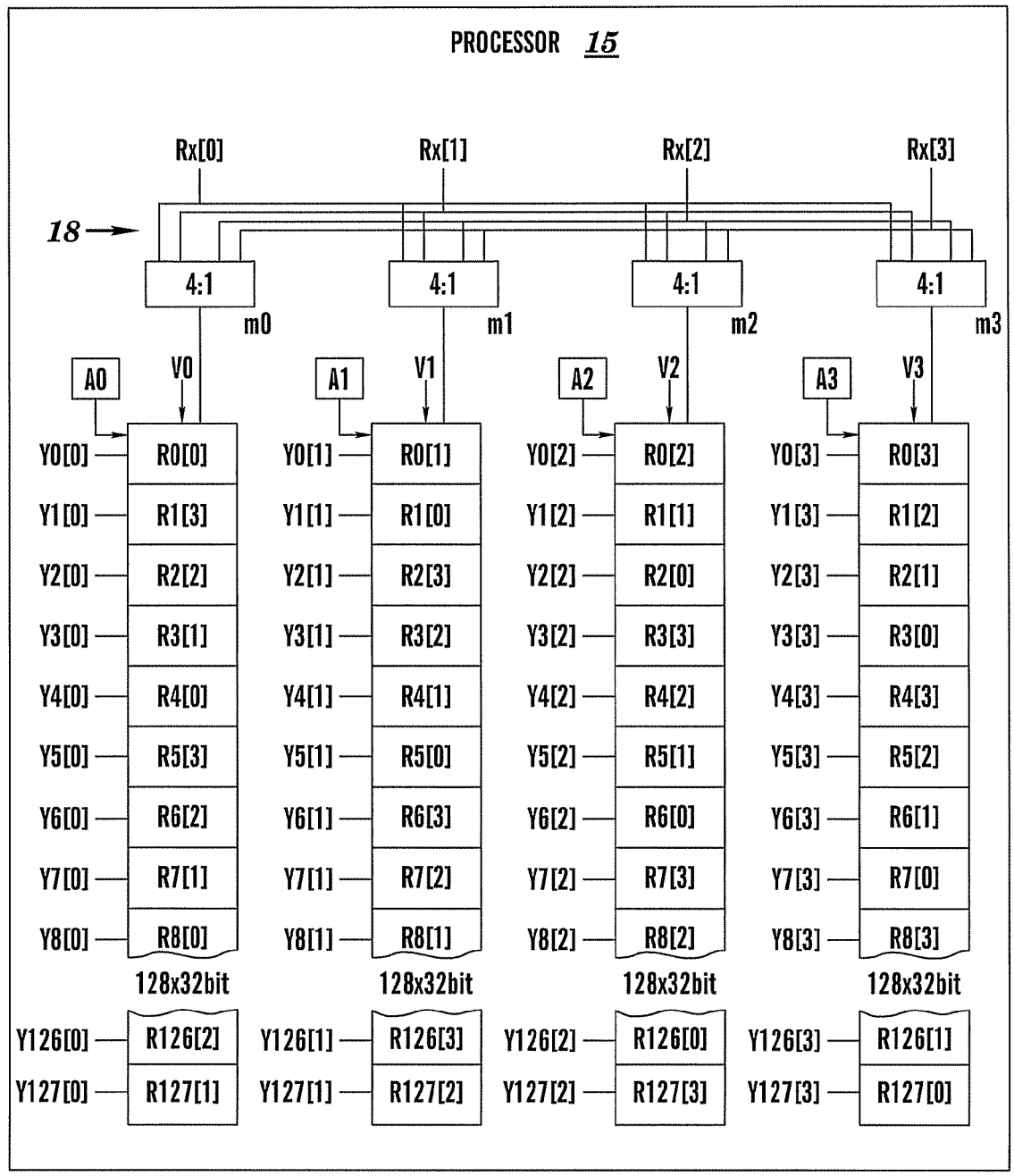
FIG. 4 depicts the physical layout of FIG. 2 for storing the data elements of the matrix of FIG. 1 and multiplexors for writing the data elements of the matrix of FIG. 1 into the physical layout, in accordance with embodiments of the present invention.

FIG. 4 depicts processor 15, comprising vector register files (V0, V1, V2, V3), address registers (A0, A1, A2, A3), and 4:1 multiplexors (m0, m1, m2, and m3), in accordance with embodiments of the present invention. In FIG. 4, the vector register files are used in conjunction with the address registers and multiplexors to write rows or subcolumns of the matrix 10 of FIG. 1 to the vector register files V0, V1, V2, and V3. The vector register files (V0, V1, V2, V3), the address registers (A0, A1, A2, A3), and the distribution of data elements Rn[m] of the matrix 10 of FIG. 1 within the registers Yi[j] of the vector register files are the same as in FIG. 2, described supra. In FIG. 4, the distribution of data array elements Rn[m] within the registers of the vector register files V0, V1, V2, and V3 facilitates addressing of both the rows and subcolumns of the matrix 10 of FIG. 1 for vector-write operations, as will be explained infra in conjunction with FIG. 5.

The multiplexors m0, m1, m2, and m3 in FIG. 4 sequentially order the data elements to be written into the vector register files V0, V1, V2, and V3 in conjunction with logical interconnections 18 between the vector register files V0, V1, V2, V3 and the multiplexors m0, m1, m2, and m3. The logical interconnections 18 are described in a write-logic table 40 shown in FIG. 5, as will be discussed next.

FIG. 5 depicts a write-logic table 40 for writing rows and subcolumns of the matrix 10 of FIG. 1 to the vector register files V0, V1, V2, and V3 while utilizing the multiplexors m0, m1, m2, and m3 of FIG. 2, in accordance with embodiments of the present invention. In FIG. 5, column 41 of the write-logic table 40 lists registers R0, R1, . . . , R255 of FIG. 1. Columns 42-45 of the write-logic table 40 list the values of address registers A0, A1, A2, A3. Columns 46-49 of the write-logic table 40 list the values of multiplexors m0, m1, m2, and m3. Each row of the matrix 10 to be written is identified by the index n which selects a register Rn in the range $0 \leq n \leq 127$. Each subcolumn of the matrix 10 to be written is identified by the index n which selects a register Rn in the range $128 \leq n \leq 255$.

The data elements of each row or subcolumn to be written, as selected by register Rn (n=0, 1, . . . , 255), is distributed into the registers Yi[j] of the vector register files V0, V1, V2, and V3 according to the following rule. Recall that Yi[j] denotes register i of vector register file Vj. Let the sequentially ordered data elements associated with register Rn (as identified in FIG. 1) be denoted as Rn[0], Rn[1], Rn[2], and Rn[3]. The rule is that data elements Rn[0], Rn[1], Rn[2], and Rn[3] are written in vector register files V(j0), V(j1), V(j2), and V(j3), respectively, wherein multiplexors m(j0), m(j1), m(j2), and m(j3) contain 0, 1, 2, and 3, respectively. As an example, if m0=1, m1=2, m2=3, and m3=0 then Rn[0], Rn[1], Rn[2], and Rn[3] are written into vector register files V3, V0, V1, and V2, respectively, reflecting m3=0, m0=1, m1=2, and m2=3. The address registers A0, A1, A2, and A3 contain the register number within vector register files V0, V1, V2, and V3, respectively, into which the data elements are written. Thus in the preceding example, data element Rn[0] is written into register 34 of vector register file V3 if address register A3 contains the value 34.

As an example of writing a row, assume that the row to be written is associated with register R2 (see FIG. 1). From the R2 row of FIG. 1, the sequence of data elements associated with R2 is R2[0], R2[1], R2[2], and R2[3]. From the R2 row of FIG. 4, A0=2, A1=2, A2=2, A3=2, m0=2 and m1=3, m2=0, m3=1. Thus, according to the preceding rule, the sequence of data elements R2[0], R2[1], R2[2], and R2[3] associated with register R2 are distributed into the vector register files V2, V3, V0, and V1 as reflecting m2=0, m3=1, m0=2, and m1=3. Thus data element R2[0] is written into vector register file V2 at register position 2 (i.e., Y2[2]) since A2=2 in consistency with FIG. 4. Data element R2[1] is written into vector register file V3 at register position 2 (i.e., Y2[3]) since A3=2 in consistency with FIG. 4. Data element R2[2] is written into vector register file V0 at register position 2 (i.e., Y2[0]) since A0=2 in consistency with FIG. 4. Data element R2[3] is written into vector register file V1 at register position 2 (i.e., Y2[1]) since A1=2 in consistency with FIG. 4.

As an example of writing a subcolumn, assume that the subcolumn to be written is associated with register R129 (see FIG. 1). From the R129 subcolumn of FIG. 1, the sequence of data elements associated with R129 is R0[1], R1[1], R2[ ], and R3[1]. From the R129 row of FIG. 4, A0=3, A1=0, A2=1, A3=2 and m0=3, m1=0, m2=1, and m3=2. Thus, according to the preceding rule, the sequence of data elements R0[1], R1[1], R2[1], and R3[1] associated with register R129 are distributed into the vector register files V1, V2, V3, and V0 as reflecting m1=0, m2=1, m3=2, and m0=3. Thus data element R0[1] is written into vector register file V1 at register position 0 (i.e., Y0[1]) since A1=0 in consistency with FIG. 4. Data element R1[1] is written into vector register file V2 at register position 1 (i.e., Y1[2]) since A2=1 in consistency with FIG. 4. Data element R2[1] is written into vector register file V3 at register position 2 (i.e., Y2[3]) since A3=2 in consistency with FIG. 4. Data element R3[1] is written into vector register file V0 at register position 3 (i.e., Y3[0]) since A0=3 in consistency with FIG. 4.

Thus, the multiplexors m0, m1, m2, and m3 are adapted to respond to a command to write a row (or subcolumn) of the matrix by mapping the data elements of the row (or subcolumn) to the vector register files V0, V1, V2, and V3 in accordance with a write-row (or write-column) mapping algorithm as exemplified by the write-logic table 40 of FIG. 5. Instead of using the write-logic table 40 having numerical values therein, one could alternatively implement the write-row (or write-column) mapping algorithm by use of Boolean logic statements.

Although the embodiments described in FIGS. 1-5 described a matrix having 128 rows and 4 columns, wherein each column is divided into 32 subcolumns with 4 data elements in each subcolumn, the scope of the present invention generally includes a matrix of having N rows and M columns such that the matrix includes a total of L data elements such that L=N*M. Each row of the N rows is addressable, and each subcolumn of the K subcolumns is addressable. Each data element comprises B binary bits. The parameters N, M, K, and B may be subject to the following constraints: N≧2, M≧2, K≧1, and B≧1. For the examples illustrated in FIGS. 1-5, N=128, M=4, K=32, and B=32.

The examples illustrated in FIGS. 1-5 illustrate the following relationships involving N, M, and K: K*M=N, N mod K=0, N mod M=0, N=$2^P$ such that P is a positive integer of at least 2, M=$2^Q$ such that Q is a positive integer of at least 2, each subcolumn of each column includes M rows of the N rows, the total number of binary bits in each subcolumn and the total number of binary bits in each row are equal to a constant number of binary bits (128 bits for FIGS. 1-5).

The preceding relationships involving N, M, and K are merely illustrative and not limiting. The following alternative non-limiting relationships are included within the scope of the present invention. A first alternative relationship is that the subcolumns of a given column do not have a same (i.e., constant) number of data elements. A second alternative relationship is that the total number of binary bits in each subcolumn is unequal to the total number of binary bits in each row. A third alternative relationship is that at least two columns have a different number K of subcolumns. A fourth alternative relationship is that N mod K≠0. A fifth alternative relationship is that there is no value of P satisfying N=$2^P$ such that P is a positive integer of at least 2. A sixth alternative relationship is that there is no value of Q satisfying M=$2^Q$ such that Q is a positive integer of at least 2.

The scope of the present invention also includes embodiment in which the B binary bits of each data element are configured to represent a floating point number, an integer, a bit string, or a character string.

Additionally, the present invention includes a processor having a plurality of vector register files. The plurality of vector register files is adapted to collectively store the matrix of L data elements. Note that the L data elements are not required to be stored duplicatively within the processor, because the rows and the subcolumns of the matrix are each individually addressable through use of vector register files in combination with address registers and multiplexors within the processor, as explained supra in conjunction with FIGS. 1-5.

In embodiments of the present invention, illustrated supra in conjunction with FIGS. 1-5, the data elements of each subcolumn are adapted to be stored in different vector register files, and the data elements of each row are adapted to be stored in different vector register files. In addition, the data elements of each subcolumn are adapted to be stored in different relative register locations of the different vector register files, and the data elements of each row are adapted to be stored in a same relative register location of the different vector register files.

While the matrix 10 is depicted in FIG. 1 with the N rows being horizontally oriented and the M columns being vertically oriented, the scope of the present invention also includes embodiments in which the N rows are vertically oriented and the M columns are horizontally oriented FIGS. 6A-6C depict instructions which utilize the multiplexors of FIG. 2 or FIG. 4 to perform operations with selectivity with respect to the data elements of a row or subcolumn of the matrix 10 of FIG. 1, in accordance with embodiments of the present invention.

FIG. 6A depicts an instruction in which data elements of an array R(RA) associated with register RA are copied to data element positions within an array R(DEST) associated with register DEST. The 2-bit words aa, bb, cc, and dd respectively correspond to the values of multiplexors m0, m1, m2, and m3 of FIG. 2 or FIG. 4. Let array R(RA) have data elements R(RA)[0], R(RA)[1], R(RA)[2], R(RA)[3] therein. Let array R(DEST) have data elements R(DEST)[0], R(DEST)[1], R(DEST)[2], R(DEST)[3] therein. The operation of FIG. 6A copies R(RA)[aa], R(RA)[bb], R(RA)[cc], R(RA)[dd] into R(DEST)[0], R(DEST)[1], R(DEST)[2], R(DEST)[3], respectively. Thus the multiplexor values m0, m1, m2, and m3 control the movement of data from the array R(RA) to the array R(DEST), with selectivity with respect to the elements of array R(RA). To illustrate, consider the following three examples.

In the first example relating to the instruction depicted by FIG. 6A, set aa=0, bb=1, cc=2, dd=3. This is a conventional array-copy operation in which the elements R(RA)[0], R(RA)[1], R(RA)[2], and R(RA)[3] are respectively copied into R(DEST)[0], R(DEST)[1], R(DEST)[2], R(DEST)[3].

In the second example relating to the instruction depicted by FIG. 6A, set aa=0, bb=0, cc=0, dd=0, which results in copying R(RA)[0] into each of R(DEST)[0], R(DEST)[1], R(DEST)[2], R(DEST)[3]. This function, often referred to as a 'splat' operation, supports scalar-vector operations.

In the third example relating to the instruction depicted by FIG. 6A, set aa=3, bb=2, cc=1, dd=0, which results in copying R(RA)[3], R(RA)[2], R(RA)[1], and R(RA)[0] into R(DEST)[0], R(DEST)[1], R(DEST)[2], and R(DEST)[3], respectively. Thus R(RA) is copied to R(DEST) with reversal of the order of the data elements of R(RA).

The preceding examples are merely illustrative. Since there are 256 permutations (i.e., $4^4$) of aa, bb, cc, and dd the operation of FIG. 6 includes 256 operation variants. In addition, both RDEST≠RA and RDEST=RA are possible. Thus, the case of RDEST=RA facilitates internal rearranging the data elements of R(RA) in accordance with any of 256 different permutations. All of these operations require use of the multiplexors m0, m1, m2, and m3. Note that all of these operations are essentially free since the multiplexors m0, m1, m2, and m3 must be present to effectuate addressing of the rows and subcolumns of the matrix 10 of FIG. 1, as explained supra in conjunction with FIGS. 1-5.

FIG. 6B depicts an instruction in which data elements of an array R(RA) associated with register RA are copied to data element positions within an array R(DEST) associated with register DEST, with masking of selected elements of R(RA). That is, Q elements of R(RA) are masked (i.e., not copied) to R(DEST) and the remaining 4-Q elements of R(RA) are copied to R(DEST), wherein $0 \leq Q \leq 4$. Let B0, B1, B2, and B3 denote the mask bits required by this operation. Then R(RA)[m] is copied/not copied to R(DEST)[m] if Bm=1/0 for m=0, 1, 2, and 3. This would normally be accomplished by a read-modify-write sequence, but is facilitated here by the use of individual vector register files, V0, V1, V2 and V3.

FIG. 6C depicts an instruction in which a single data element of an array R(RA) associated with register RA is combined functionally (in accordance with the function f) with an array R(RB) associated with register RB. The functional result is stored in an array R(DEST) associated with register DEST, and the elements of R(RA)[aa] are used to perform the function f. The two-bit word aa selects a single data element of the array R(RA) associated with register RA by setting the read multiplexors m0, m1, m2, and m3 (in FIG. 2) such that all four multiplexors select that single data element. For example, if the function f denotes "addition" then the following SUM vector (having components SUM[0], SUM[1], SUM[2], SUM[3]) would be formed and stored in R(DEST):

SUM[0]=*R(RA)[aa]*+*R(RB)*[0];

SUM[1]=*R(RA)[aa]*+*R(RB)*[1];

SUM[2]=*R(RA)[aa]*+*R(RB)*[2];

SUM[3]=*R(RA)[aa]*+*R(RB)*[3].

Again, this operation is essentially free since the read multiplexors m0, m1, m2, and m3 are already present.

There are many other operations, in addition to the operations illustrated in FIGS. 6A-6C, which could be performed with selectivity with respect to the data elements of an array (i.e., row or subcolumn) of the matrix 10 of FIG. 1. Said selectivity is controlled by the multiplexors m0, m1, m2, and m3 of FIG. 2 or FIG. 4.

Figure 7:
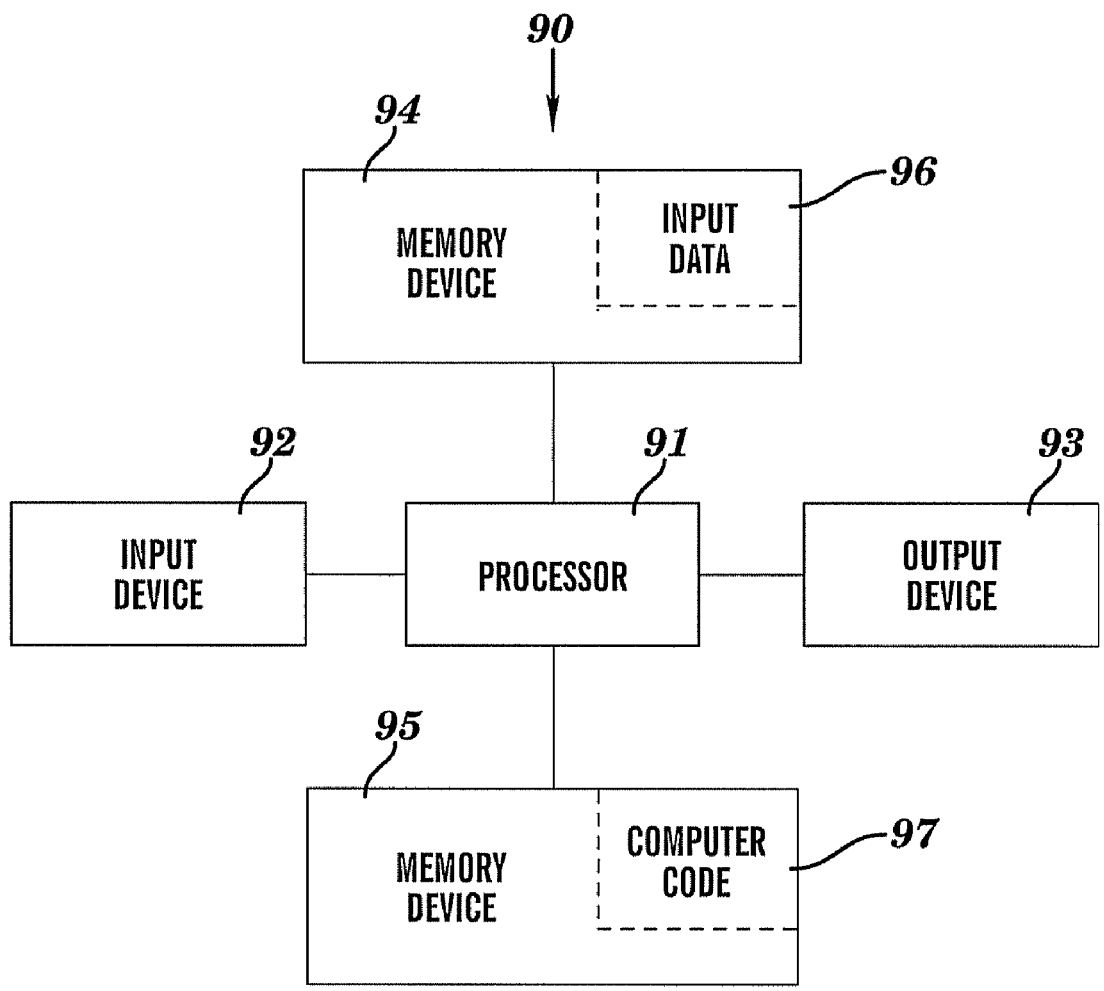
FIG. 7 depicts a computer system having a processor for addressing rows and subcolumns of a matrix used in vector processing, in accordance with embodiments of the present invention.

FIG. 7 depicts a computer system 90 having a processor 91 for addressing rows and subcolumns of a matrix used in vector processing and for executing an instruction that performs an operation on an array of the matrix with selectivity with respect to the data elements of the array, in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 may comprise the processor 15 of FIGS. 2 and 4. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for using rows and subcolumns of a matrix in vector processing and for executing an instruction that performs an operation on an array of the matrix with selectivity with respect to the data elements of the array. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   providing a processor comprising M independent vector register files and M address registers, wherein each address register of the M address registers is associated with a corresponding one of the M vector register files, and wherein each vector register file is independently addressable through its associated address register pointing to one of the N registers of said vector register file; and
   distributing a matrix of L data elements in M independent vector register files comprised by a processor resulting in the M vector register files collectively storing the matrix, each data element having B binary bits, said matrix having N rows and M columns, said L=N*M, each column having K subcolumns, said N$\geq$2, said M$\geq$2, said K$\geq$2, said N=K*M, said B$\geq$1, each row of said N rows being addressable, each subcolumn of said K subcolumns being addressable, wherein each of the M vector register files includes an array of N registers, wherein each of the N*M registers of the M vector register files is storing a data element of the L data elements, wherein the data elements of each subcolumn are stored in different vector register files, wherein the data elements of each row are stored in different vector register files.

2. The method of claim 1, wherein the method further comprises:
   storing the data elements of each subcolumn in different relative register locations of different vector register files of the M vector register files; and
   storing the data elements of each row are stored in a same relative register location of the different vector register files.

3. The method of claim 1, wherein M multiplexors are respectively coupled to the M vector register files, and wherein each multiplexor of the M multiplexors comprises a set of binary switches subject to each binary switch being on or off and respectively represented by a binary bit 1 or 0 such that the value of the multiplexor consists of the composite value of said binary bits.

4. The method of claim 3, wherein the method further comprises responding to a command to read a row of the matrix, wherein said responding comprises mapping the data elements of the row from the M vector register files to the row of the matrix in accordance with a read-row mapping algorithm, and wherein said responding is performed by the M multiplexors.

5. The method of claim 3, wherein the method further comprises responding to a command to read a subcolumn of the matrix, wherein said responding comprises mapping the data elements of the subcolumn from the M vector register files to the subcolumn of the matrix in accordance with a read-subcolumn mapping algorithm, and wherein said responding is performed by the M multiplexors.

6. The method of claim 3, wherein the method further comprises responding to a command to write a subcolumn of the matrix, wherein said responding comprises write the data elements of the subcolumn from the M vector register files to the subcolumn of the matrix in accordance with a write-subcolumn mapping algorithm, and wherein said responding is performed by the M multiplexors.

7. The method of claim 1, wherein the method further comprises executing an instruction that performs an operation on a first array of a set of arrays with selectivity with respect to the data elements of the first array, and said executing the instruction is performed by the processor.

8. The method of claim 7, wherein M multiplexors are respectively coupled to the M vector register files, wherein each multiplexor of the M multiplexors comprises a set of binary switches subject to each binary switch being on or off and respectively represented by a binary bit 1 or 0 such that the value of the multiplexor consists of the composite value of said binary bits, and wherein the values associated with the M multiplexors control said selectivity.

9. The method of claim 7, wherein the instruction is configured to copy at least one data element of the first array of the set of arrays to a second array of the set of arrays, and wherein the instruction does not insert an exact copy of the first array into the second array.

10. The method of claim 7, wherein the instruction is configured to rearrange the data elements of the first array within the first array.

11. The method of claim 1, wherein the processor is not configured to duplicatively store the L data elements.

12. The method of claim 1, wherein the method further comprises addressing a row of the N rows.

13. The method of claim 1, wherein the method further comprises addressing a subcolumn of the K*M subcolumns.

* * * * *